United States Patent
Kim

(10) Patent No.: US 6,999,802 B2
(45) Date of Patent: Feb. 14, 2006

(54) PORTABLE COMMUNICATION APPARATUS WITH DIGITAL CAMERA AND PERSONAL DIGITAL ASSISTANT

(75) Inventor: Young-Se Kim, Los Altos, CA (US)

(73) Assignee: Samsung Electronics Co., Ltd. (KR)

( * ) Notice: Subject to any disclaimer, the term of this patent is extended or adjusted under 35 U.S.C. 154(b) by 475 days.

(21) Appl. No.: 10/178,583

(22) Filed: Jun. 24, 2002

(65) Prior Publication Data

US 2003/0064685 A1 Apr. 3, 2003

Related U.S. Application Data

(60) Provisional application No. 60/301,323, filed on Jun. 26, 2002.

(30) Foreign Application Priority Data

Jun. 11, 2002 (KR) ....................... 2002-32513

(51) Int. Cl.
*H04M 1/03* (2006.01)

(52) U.S. Cl. ................. 455/575.1; 455/556.2; 455/566; 348/373

(58) Field of Classification Search .............. 455/550.6, 455/556.1, 556.2, 566, 569.1, 575.1, 575.3; 348/14.02, 14.03, 207.99, 373–376
See application file for complete search history.

(56) References Cited

U.S. PATENT DOCUMENTS 6,009,336 A * 12/1999 Harris et al. ................ 455/566
6,434,403 B1 * 8/2002 Ausems et al. ........... 455/556.2
6,510,325 B1 * 1/2003 Mack et al. .............. 455/575.2
6,549,789 B1 * 4/2003 Kfoury ..................... 455/550.1
6,567,677 B1 * 5/2003 Sokoloff ................. 379/433.02
6,704,586 B1 * 3/2004 Park ......................... 455/575.3
6,731,952 B1 * 5/2004 Schaeffer et al. ........... 455/557
6,782,281 B1 * 8/2004 Nagasawa ................ 455/575.3
6,795,715 B1 * 9/2004 Kubo et al. .............. 455/556.1

* cited by examiner

*Primary Examiner*—Edward F. Urban
*Assistant Examiner*—Blane J. Jackson
(74) *Attorney, Agent, or Firm*—Dilworth & Barrese LLP

(57) ABSTRACT

The present invention discloses a portable digital camera communication apparatus which also serves as a PDA. The portable communication apparatus which performs both a phone operation mode and a PDA operation mode and has a digital camera includes: a first housing including an upper portion, a lower portion, a receiving space hollowed between the upper portion and the lower portion, and a planar surface provided at the bottom of the receiving space, a lens housing protruding from the upper portion in a longitudinal direction, a digital camera lens of the digital camera being exposed in a longitudinal direction of the lens housing; a second housing including an upper portion having a phone LCD and a phone keypad with a plurality of keys and a lower portion having a PDA touch screen, the PDA touch screen being adjacent to the planar surface in the phone operation mode, the phone keypad and the phone LCD being adjacent to the planar surface in the PDA operation mode; and a biaxial hinge unit for connecting the second housing to said first housing to allow said second housing to rotate about two perpendicular axes with respect to the first housing.

10 Claims, 12 Drawing Sheets

PORTABLE COMMUNICATION APPARATUS WITH DIGITAL CAMERA AND PERSONAL DIGITAL ASSISTANT

PRIORITY

This application claims priorities to a provisional application entitled "PORTABLE COMMUNICATION APPARATUS WITH DIGITAL CAMERA AND PERSONAL DIGITAL ASSISTANT" filed in the U.S. Patent and Trademark Office on Jun. 26, 2001 and assigned Ser. No. US 60/301,323, and to application entitled "PORTABLE COMMUNICATION APPARATUS WITH DIGITAL CAMERA AND PERSONAL DIGITAL ASSISTANT" filed in the Korean Intellectual Property Office on Jun. 11, 2002 and assigned Serial No. 2002-32513, the contents of both of which are hereby incorporated by reference.

BACKGROUND OF THE INVENTION

1. Field of the Invention

The present invention relates to a portable communication apparatus, and more particularly to a portable communication apparatus with a digital camera and personal digital assistant (PDA).

2. Description of the Related Art

A general portable communication apparatus requires a data input/output unit, a transmission/reception unit and an antenna unit to perform voice communication with another apparatus. In addition, the general portable communication apparatus also requires a digital camera unit to perform image communication. Operation of the data input/output unit, the transmission/reception unit, the antenna unit and the digital camera unit of the portable communication apparatus can be easily understood by those skilled in the art.

In addition, a portable communication apparatus such as the PDA enables a user to individually and conveniently use image communication or receive various wireless internet services in addition to the voice communication. When using the digital camera unit the digital camera unit takes a photo of an object, can output a photograph of the object through a printer, can display the data on an LCD monitor, and can transmit the data to the other apparatus. Many portable communication apparatuses can receive a number of convenient services in order to adapt themselves to the multimedia wireless internet environment.

A variety of portable communication apparatuses have been developed due to widening use of the wireless Internet environment. The communication apparatus are, of course, portable. One user can perform the voice communication or image communication with another user by utilizing the portable communication apparatus. Moreover, the users can chat with each other, manage personal schedules, receive wireless internet services from a telecommunication company, manage stocks in a real time, transmit a predetermined capacity of data to other users, and enjoy games anytime and anywhere by using the portable communication apparatus such as the PDA. That is, the users can perform wireless communication through the portable communication apparatus regardless of time, place, gender and age. Exemplary portable communication apparatuses include a cellular phone, a PDA, a hand held phone (HHP), a digital camera communication apparatus and a notebook computer, to name a few.

However, due to the costs of these portable communication apparatuses, most users can only afford some or only one of these apparatuses even through the user wishes to actively adapt oneself to various wireless internet environments and complex communication environments.

For example, when a user having a portable voice communication apparatus or PDA intends to perform an image communication with another user, or photograph a object and transmit the photographed data to the other user, the user must purchase a portable digital camera and connect it to the communication apparatus or PDA.

Accordingly, a portable communication apparatus having various functions is required for the various wireless internet environments or complex communication environments. In addition, since the upcoming communication era needs a portable communication apparatus which can actively adapt to an everchanging multimedia environment, a complex multi-functional portable communication apparatus for multimedia will need to be developed.

SUMMARY OF THE INVENTION

It is, therefore, an object of the present invention to provide a portable communication apparatus with a digital camera and personal digital assistant.

To achieve the above object, there is provided a portable communication apparatus which operates in a phone operation mode or a PDA operation mode, comprising a first housing including an upper portion, a lower portion, a hollow receiving space between the upper portion and the lower portion, and a planar surface provided at the bottom of the receiving space, a lens housing protruding from the upper portion in a longitudinal direction, and a digital camera wherein the lens is exposed in a longitudinal direction to the lens housing to photograph an object positioned in the longitudinal direction; a second housing including an upper portion having a phone LCD and a phone keypad with a plurality of keys, and a lower portion having a PDA touch screen, wherein the PDA touch screen is adjacent to the planar surface in the phone operation mode, while the phone keypad and the phone LCD are adjacent to the planar surface in the PDA operation mode, the second housing connected to rotate on a second hinge axis perpendicular to a first hinge axis; and a biaxial hinge unit operably connected to the second housing to rotate the second housing on the second hinge axis perpendicular to the first hinge axis.

Preferably, the upper portion includes a speaker unit and hinge arms for connecting the biaxial hinge unit.

Preferably, the lower portion includes a PDA keypad having a plurality of keys and a microphone unit.

Preferably, the upper portion includes a shutter key adjacent to the lens housing.

Preferably, the rear surface of the upper portion includes a rotatable antenna unit, wherein when the antenna unit is opened, the end portion thereof becomes distant from the lens housing.

There is also provided a portable communication apparatus which operates a phone operation mode or a PDA operation mode, comprising a first housing including an upper portion, a lower portion, a hollow receiving space between the upper portion and the lower portion, and a planar surface provided at the bottom of the receiving space, a lens housing protruding from the upper portion in a longitudinal direction, and a digital camera having a lens exposed in a longitudinal direction of the lens housing for photographing an object positioned in the longitudinal direction; a second housing including a planar upper portion and a lower portion having a touch screen, and connected to rotate on a second hinge axis perpendicular to a first hinge axis, wherein the touch screen is adjacent to the planar surface of the first housing in the phone operation mode or the PDA operation mode; and a biaxial hinge unit for connecting the second housing to rotate the second hinge axis perpendicular to the first hinge axis.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
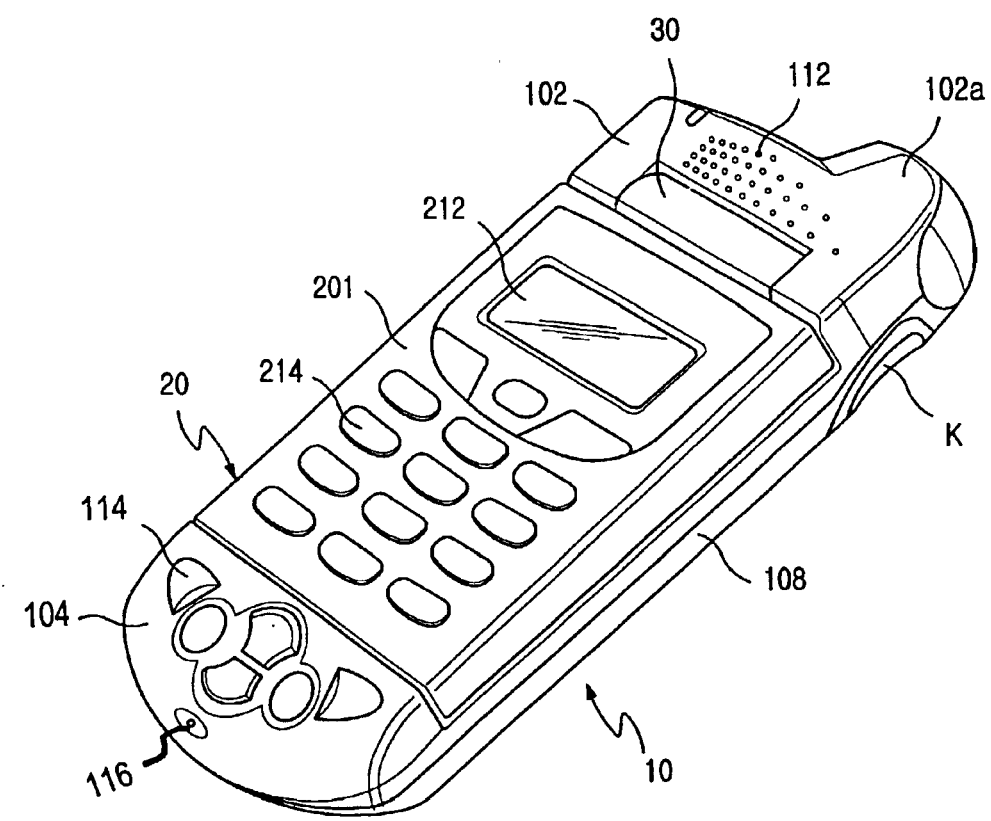
FIG. 1 is a perspective view illustrating a portable communication apparatus with a digital camera and personal digital assistant in accordance with a first embodiment of the present invention.
Figure 2:
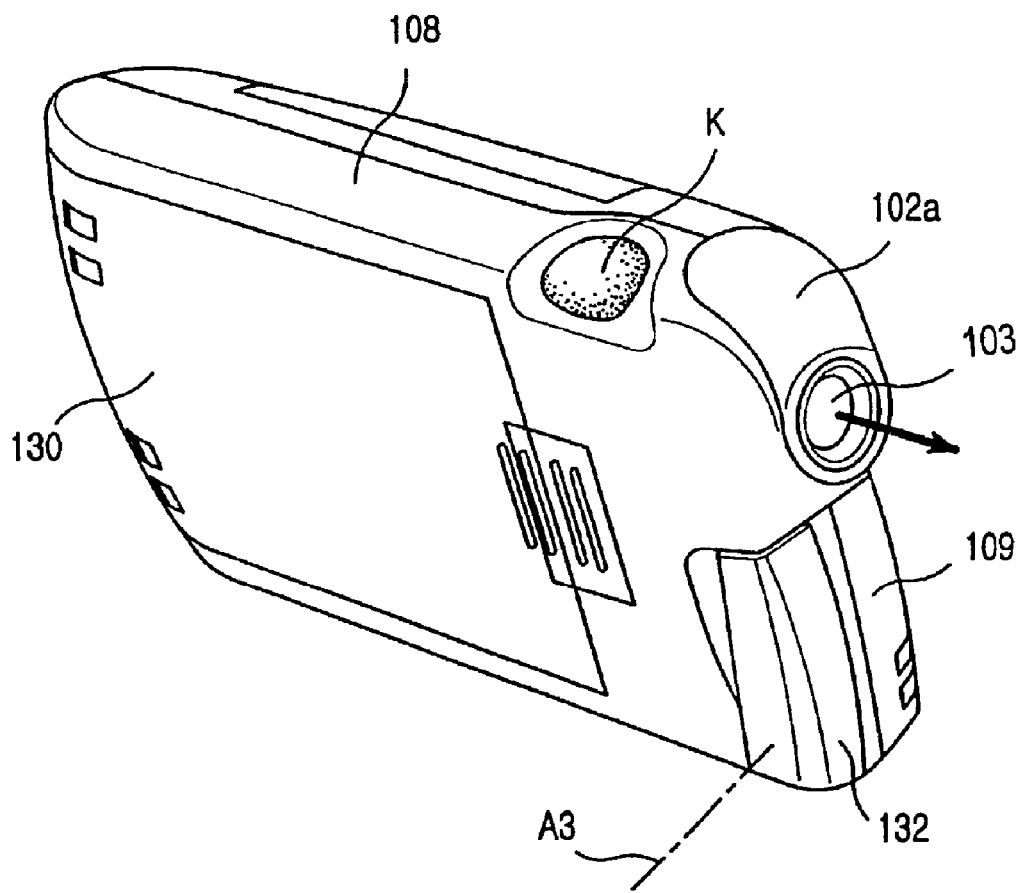
FIG. 2 is a perspective view illustrating the rear surface of the portable communication apparatus with a digital camera and personal digital assistant in a lens in accordance with the first embodiment of the present invention.
Figure 3:
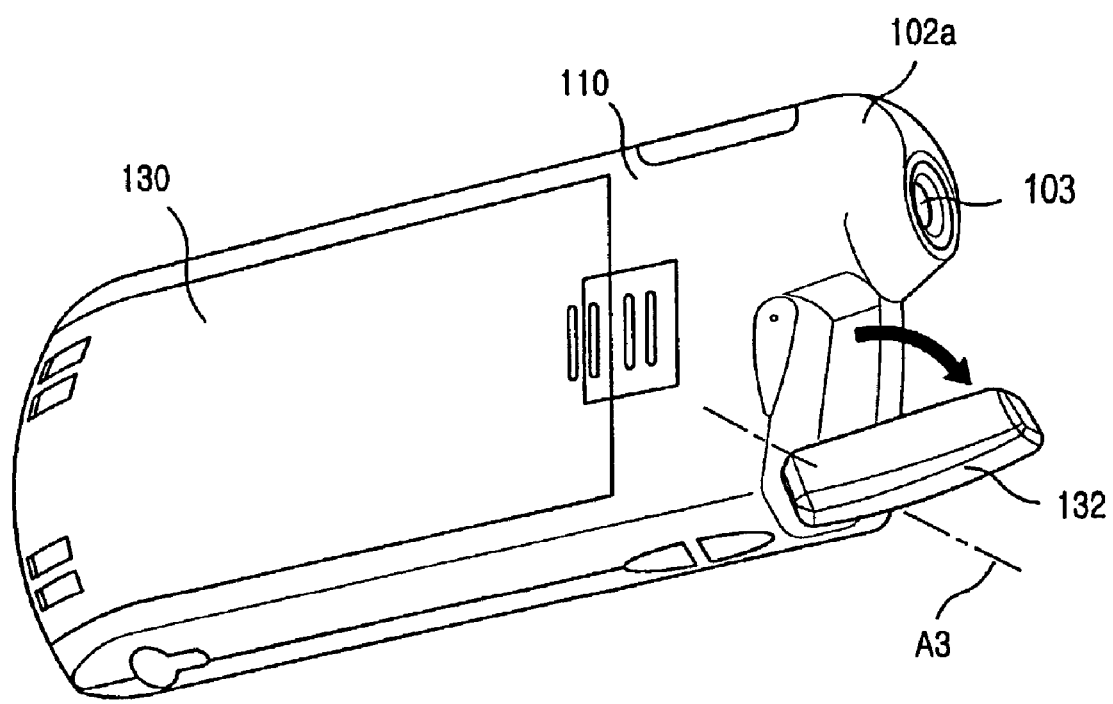
FIG. 3 is a perspective view illustrating a state where an antenna positioned on the rear surface of the portable communication apparatus with a digital camera and personal digital assistant rotates on a third hinge axis in accordance with the first embodiment of the present invention.
Figure 4:
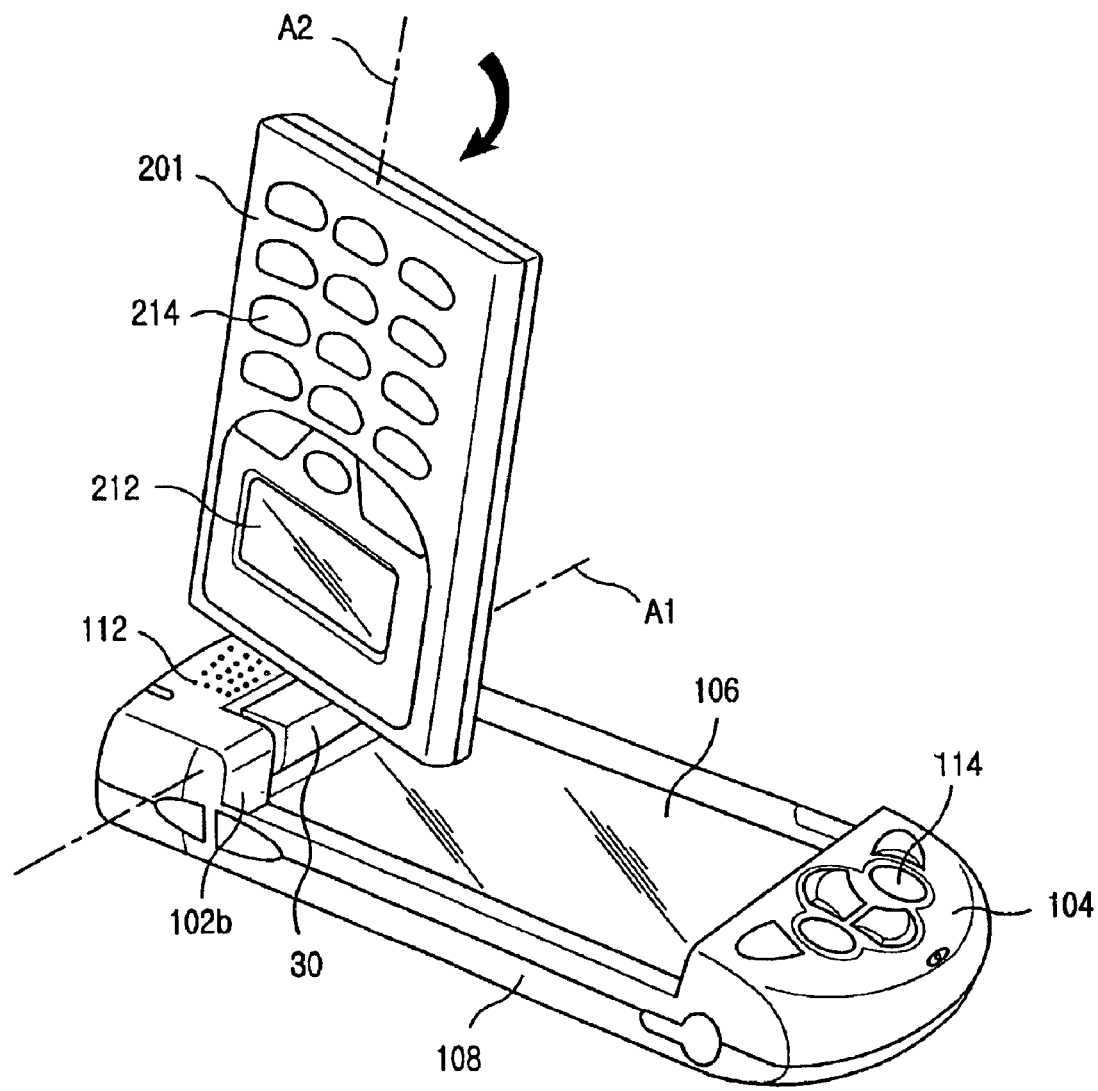
FIG. 4 is a perspective view illustrating a state where a second housing of the portable communication apparatus with a digital camera and personal digital assistant is opened on a first hinge axis in accordance with the first embodiment of the present invention.

Preferred embodiments of the present invention will now be described with reference to the accompanying drawings. In the following description, same drawing reference numerals are used for the same elements even in different drawings. The matters defined in the description such as a detailed construction and elements of a circuit are provided to assist in a comprehensive understanding of the invention. Also, well-known functions or constructions are not described in detail since they would obscure the invention in unnecessary detail.

The structure of a portable communication apparatus with a digital camera and personal digital assistant (abbreviated as 'portable communication apparatus') in accordance with a first embodiment of the present invention will now be described with reference to FIGS. 1 to 6. As illustrated in FIGS. 1 to 6, the portable communication apparatus performs a PDA operation mode, a phone operation mode and a digital camera operation mode. The portable communication apparatus includes a first housing 10, a second housing 20, and a biaxial hinge unit 30 connected to the first housing 10 and the second housing 20. Biaxial hinge unit 30 is so constructed to enable the second housing 20 to rotate around two perpendicular axes so that the phone operation mode and the PDA operation mode can be selectively used.

Figure 6:
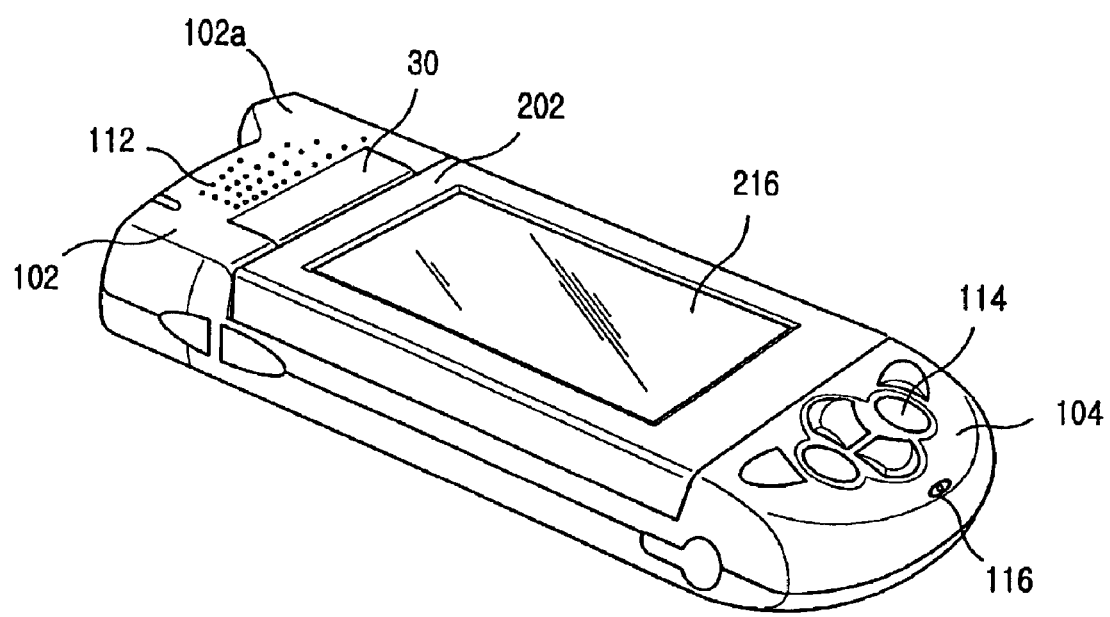
FIG. 6 is a perspective view illustrating the portable communication apparatus with a digital camera and a personal digital assistant in a PDA operation mode in accordance with the first embodiment of the present invention.
Figure 7:
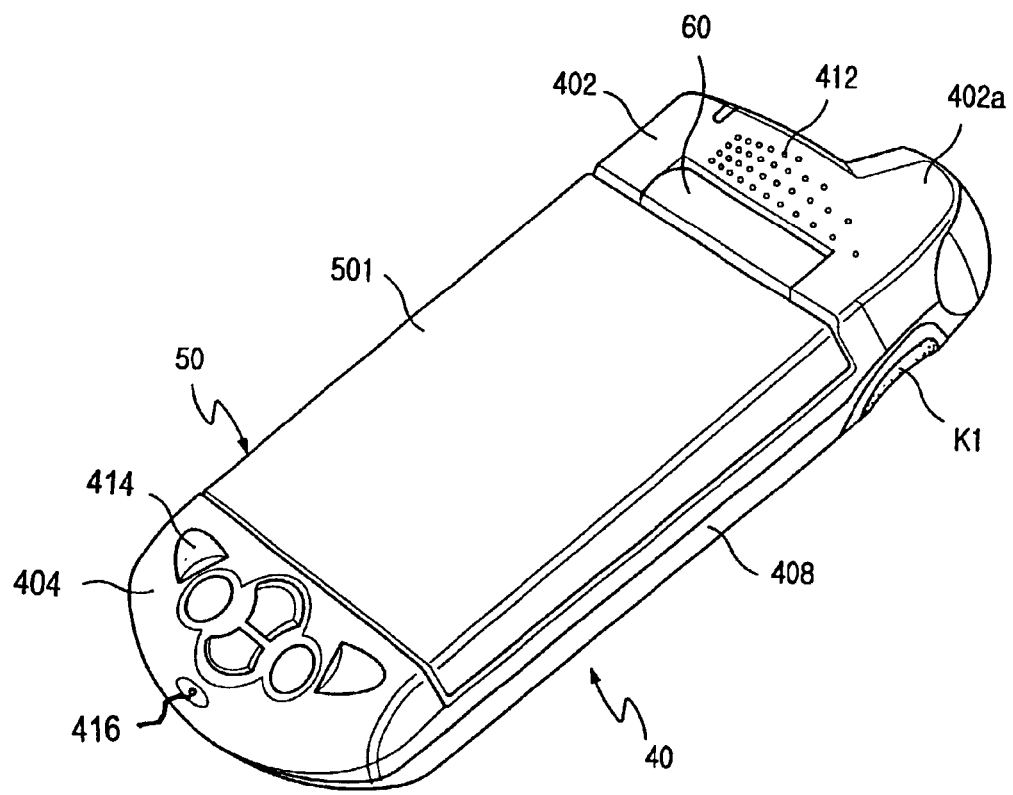
FIG. 7 is a perspective view illustrating a portable digital camera communication apparatus serving as a PDA in accordance with a second embodiment of the present invention.
Figure 8:
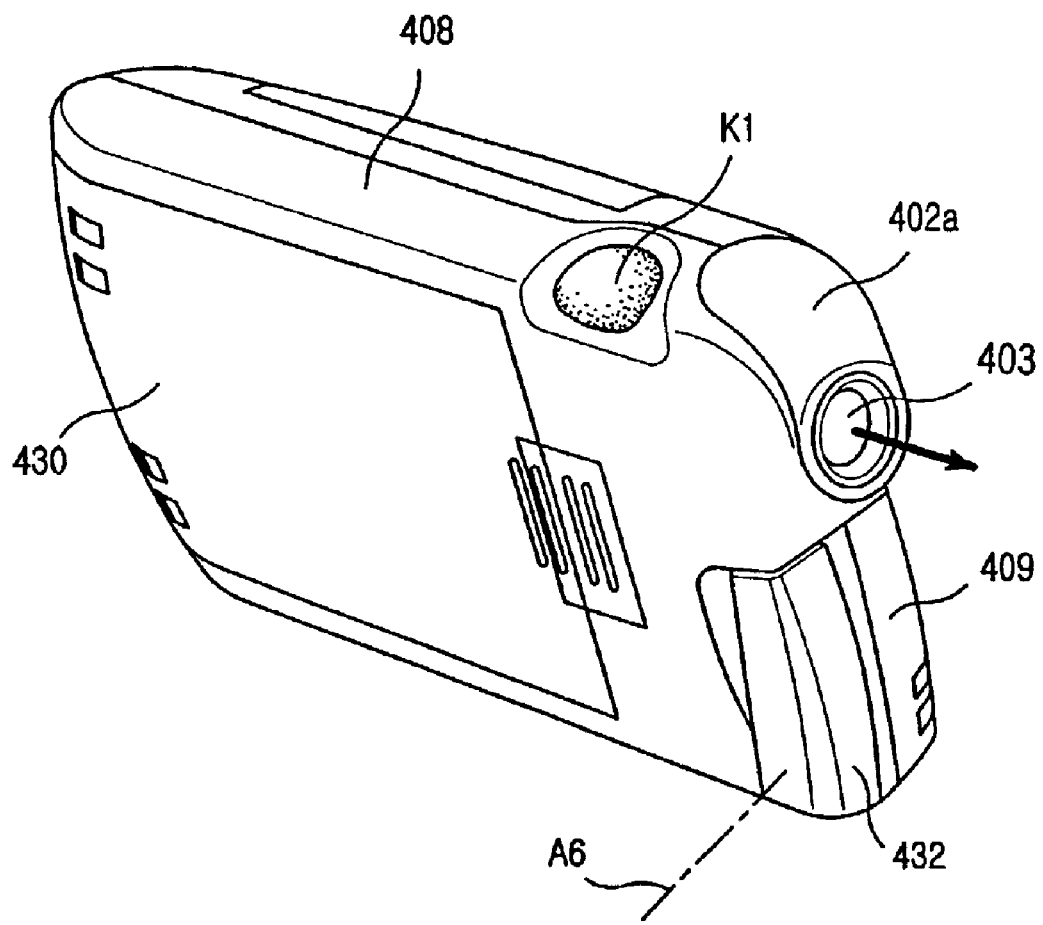
FIG. 8 is a perspective view illustrating the rear surface of the portable communication apparatus with a digital camera and a personal digital assistant in accordance with the second embodiment of the present invention.
Figure 9:
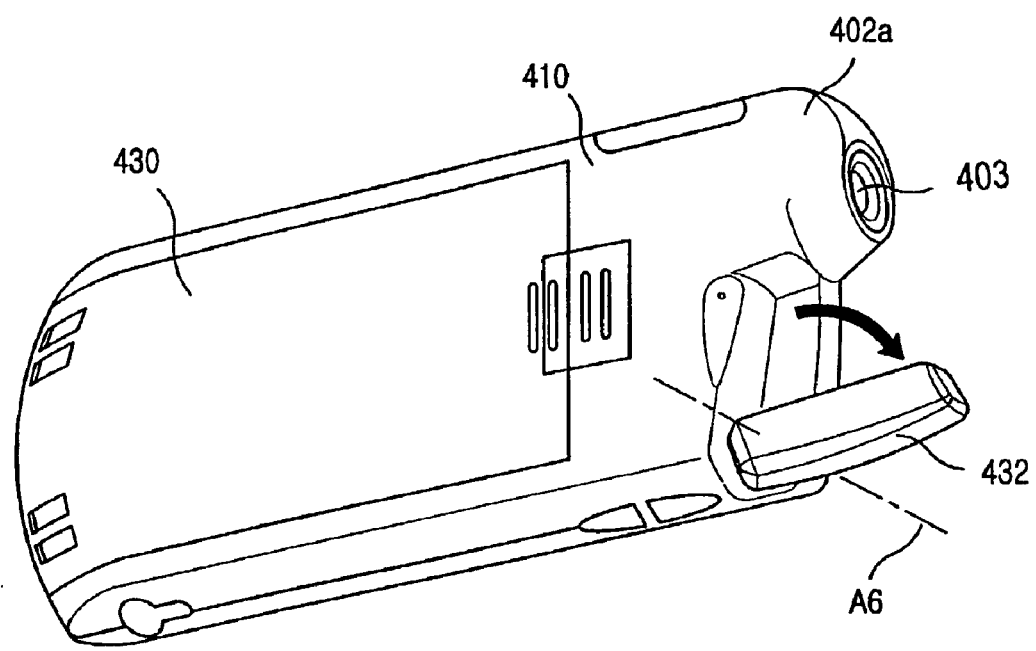
FIG. 9 is a perspective view illustrating a state where an antenna positioned on the rear surface of the portable communication apparatus with a digital camera and a personal digital assistant rotates on a third hinge axis in accordance with the second embodiment of the present invention.
Figure 10:
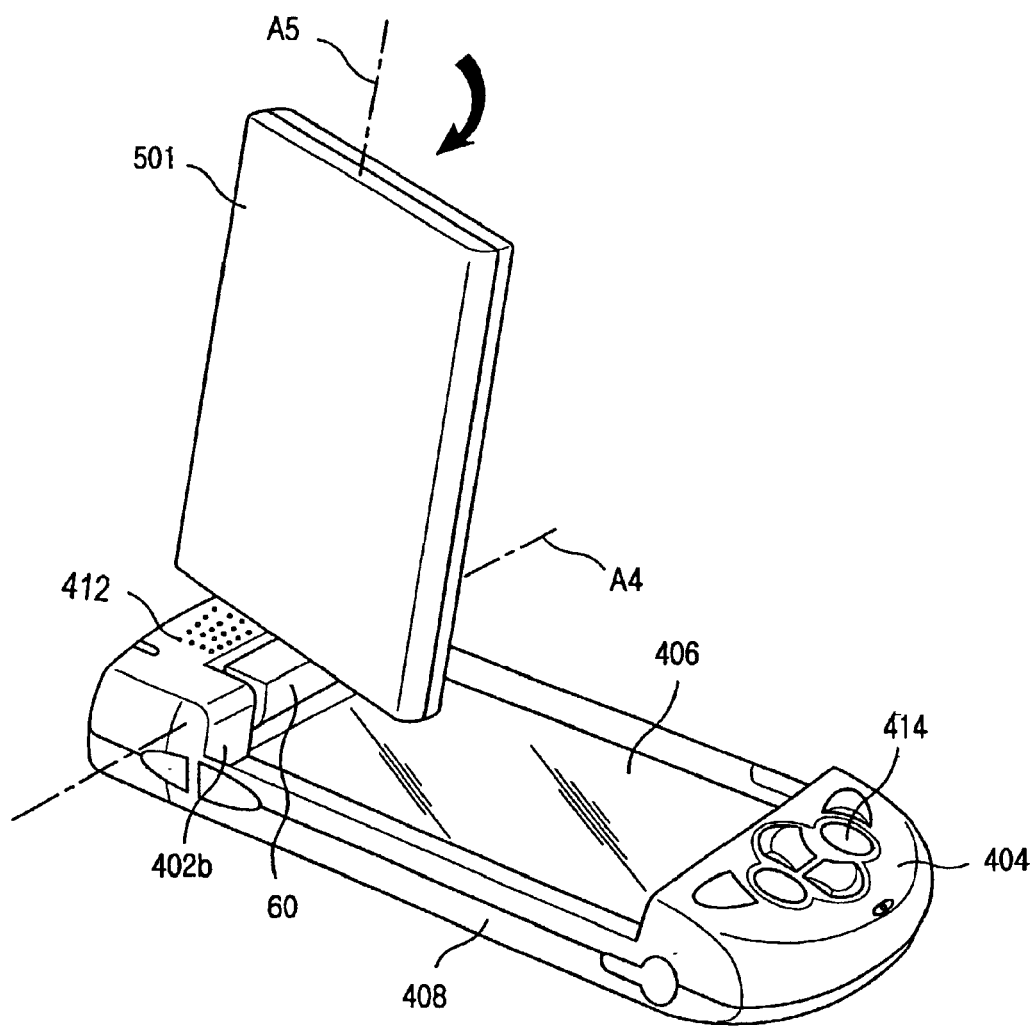
FIG. 10 is a perspective view illustrating a state where a second housing of the portable communication apparatus with a digital camera and a personal digital assistant is opened on a first hinge axis in accordance with the second embodiment of the present invention.
Figure 11:
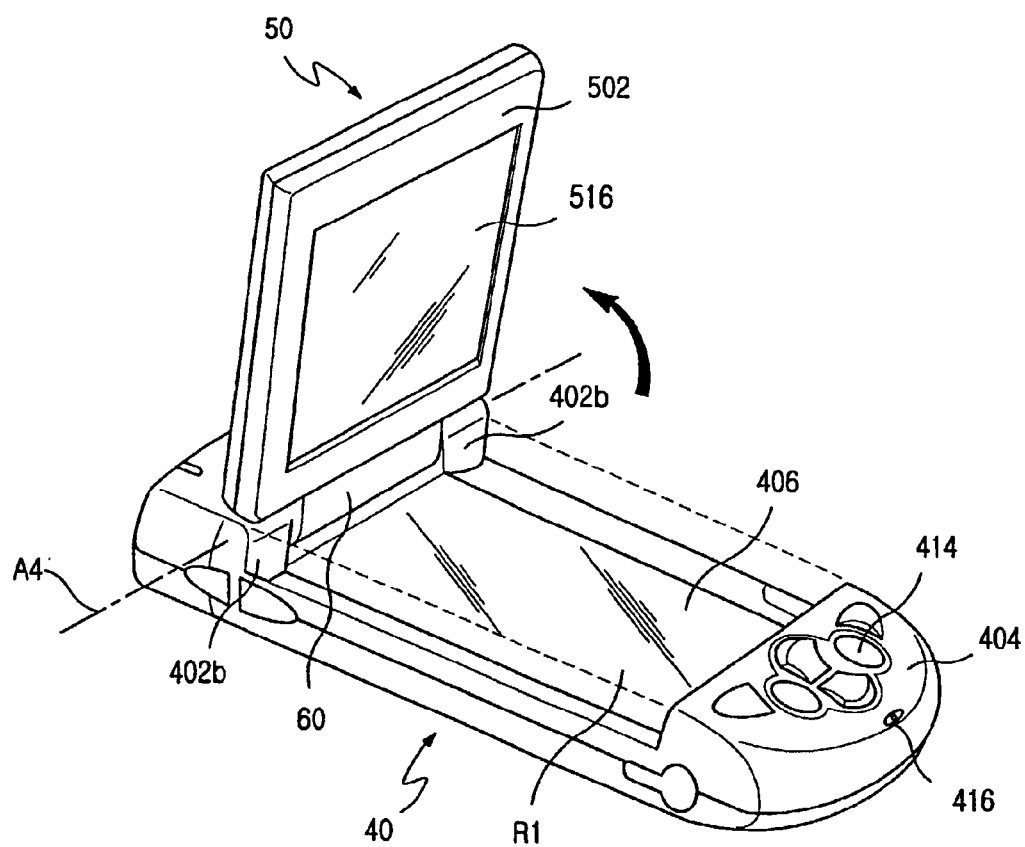
FIG. 11 is a perspective view illustrating a state where the second housing of the portable communication apparatus with a digital camera and a personal digital assistant is opened on a second hinge axis in accordance with the second embodiment of the present invention.

The portable communication apparatus of FIG. 1 is shown operating in the phone operation mode, and the portable communication apparatus of FIG. 6 is shown operating in the PDA operation mode. In addition, in the digital camera operation mode, the portable communication apparatus is used as a digital camera by pressing a shutter key K.

Figure 5:
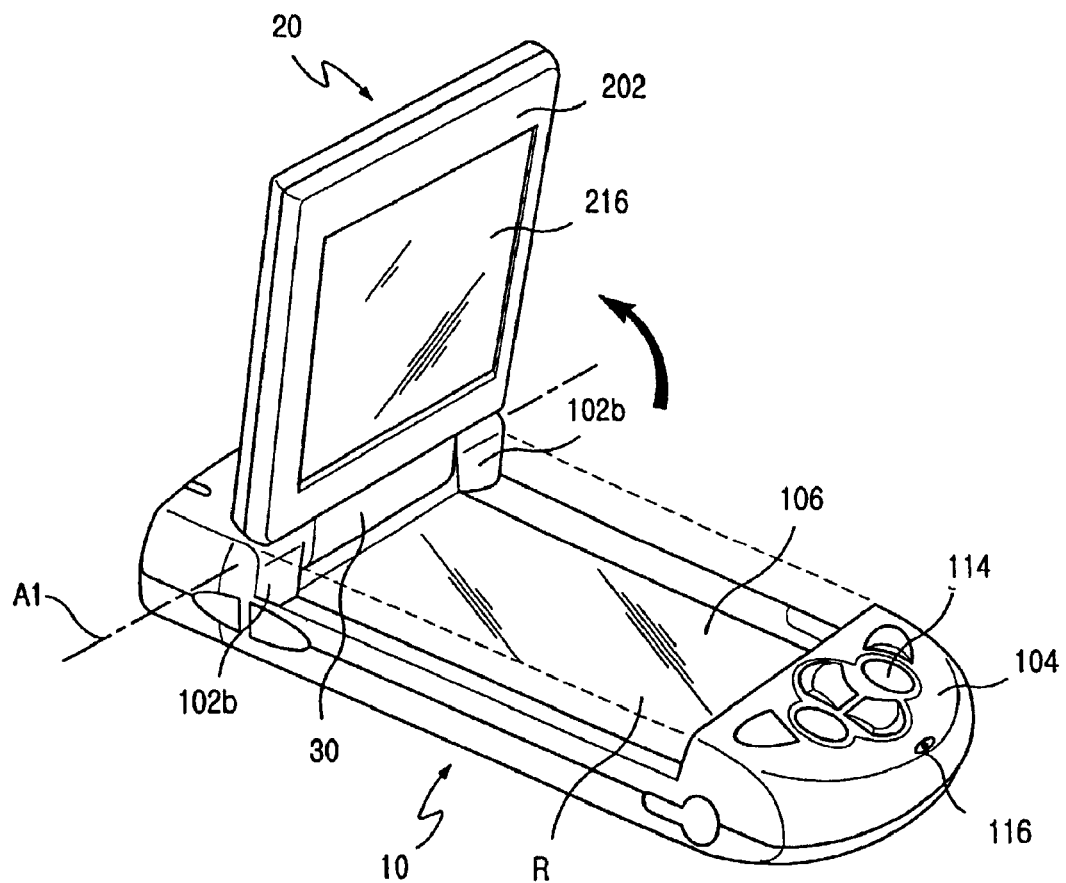
FIG. 5 is a perspective view illustrating a state where the second housing of the portable communication apparatus with a digital camera and personal digital assistant is opened on a second hinge axis in accordance with the first embodiment of the present invention.

The first housing 10 is formed in a bar shape, and includes a receiving space R as shown in FIG. 5 for receiving the second housing 20, an upper portion 102 formed at one side of the receiving space R, a lower portion 104 formed at the other side, a planar surface 106 formed between the upper portion 102 and the lower portion 104, namely at the bottom of the receiving space R, two side surfaces 108 and a front surface 109. The biaxial hinge unit 30 and a speaker unit 112 are disposed at the upper portion 102. A PDA keypad 114 composed of a plurality of keys and a microphone unit 116 are provided to the lower portion 104 to be used in the PDA operation mode.

Moreover, a lens housing 102a is protruded in a longitudinal direction from the upper portion 102. A digital camera having a lens 103 is disposed within the lens housing 102a to be exposed in a longitudinal direction of the first housing 10. An arrow of the digital camera lens 103 of FIG. 2 indicates a direction of photographing an object.

A plurality of keys are provided to the two side surfaces 108. Here, the shutter key K for converting a current mode into the digital camera operation mode is formed at one of the side surfaces 108. That is, the shutter key K is adjacent to the lens housing 102a. A battery pack 130 for supplying power to the first and second housings 10 and 20 is removably mounted on the rear surface 110. In addition, an antenna unit 132 is formed on the rear surface of the upper portion 102 and positioned to rotate about a third hinge axis A3. When the antenna unit 132 rotates, end portion of the antenna unit 132 becomes distant from the lens housing 102a.

The biaxial hinge unit 30 provides first and second hinge axes A1 and A2 which meet at right angles to each other. The first hinge axis A1 is a rotation axis when the second housing 20 rotates in a direction to and from the receiving space R of the first housing 10, and the second hinge axis A2 is a rotation axis positioned in a vertical direction from the upper portion of the first housing 10 when the second housing 20 is opened from the first housing 10, namely a hinge axis for rotating the second housing 20 in right and left directions as shown by the arrow in FIG. 4.

The second housing 20 is formed in a planar plate shape, and includes an upper portion 201 and a lower portion 202. A phone LCD 212 and a phone keypad 214 having a plurality of keys are provided on the upper portion 201. A PDA touch screen 216 is provided on the lower portion 202. In the phone operation mode, the PDA touch screen 216 of the second housing 20 is adjacent to the planar surface 106 of the first housing 10. In the PDA operation mode, the phone keypad 214 and the phone LCD 212 are adjacent to the planar surface 106.

Here, the PDA touch screen 216 has greater width and length than the phone LCD 212.

The biaxial hinge unit 30 is connected between side hinge arms 102b of the upper portion 102 to provide the first hinge axis A1, and also connected to the second housing 20 at its middle portion to provide the second hinge axis A2 of the second housing 20.

The method of using the above-described portable communication apparatus will now be explained. The phone operation mode of the portable communication apparatus is shown in FIG. 1. The user inputs data through the phone keypad 214, and confirms the input data on the phone LCD 212. The PDA operation mode of the portable communication apparatus is shown in FIG. 6. The user inputs data on the PDA touch screen 216 by using a stylus (not shown) and the PDA key pad 114, and displays the input data on the PDA touch screen 216. To operate the digital camera operation mode, the user converts a current mode into the digital camera operation mode by pressing the shutter key K.

Preferably, the second housing 20 is connected to the biaxial hinge unit 30 by a hinge module (installed in biaxial hinge unit) to rotate at 0° to 180° about second hinge axis A2.

As discussed earlier, the portable communication apparatus in accordance with the present invention serves as a PDA, a digital camera and a voice or image phone, thereby reducing expenses and improving convenience.

The structure of a portable digital camera communication apparatus (abbreviated as 'portable communication apparatus') serving as a PDA in accordance with a second embodiment of the present invention will now be explained with reference to FIGS. 7 to 12. As depicted in FIGS. 7 to 12, the portable communication apparatus performs a PDA operation, a phone operation and a digital camera operation. The portable communication apparatus includes a first housing 40, a second housing 50, and a biaxial hinge unit 60 for connecting the first housing 40 and the second housing 50 and allows the second housing to rotate about two axes A4 and A5.

Figure 12:
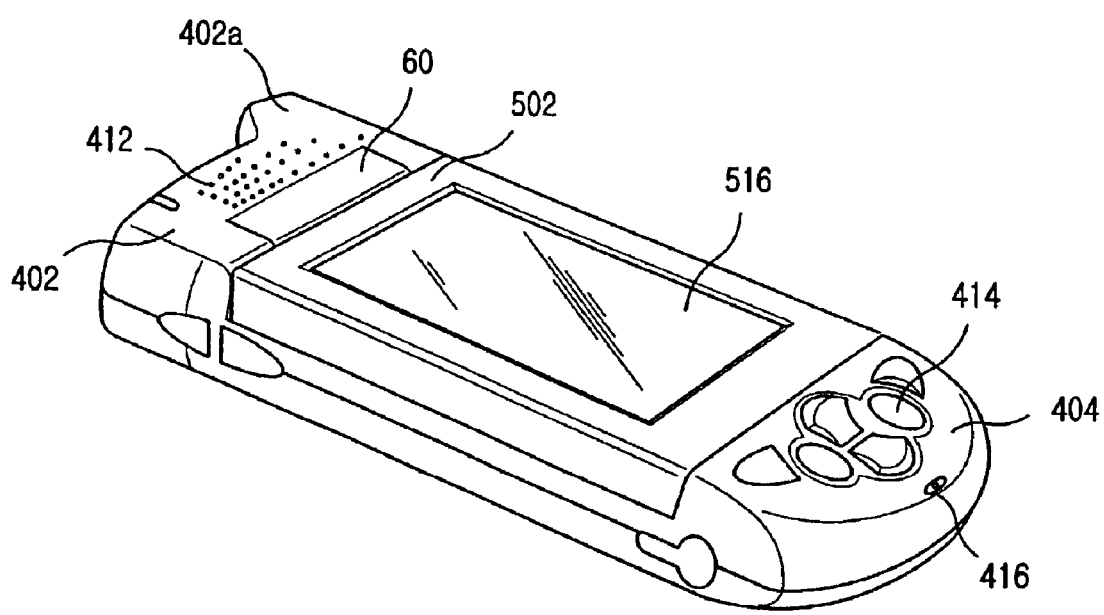
FIG. 12 is a perspective view illustrating the portable communication apparatus with a digital camera and a personal digital assistant in a phone or PDA operation mode in accordance with the second embodiment of the present invention.

FIG. 12 shows a state where the portable communication apparatus is operating in the phone and PDA operation modes. In the digital camera operation mode, the portable communication apparatus is used as a digital camera by pressing a shutter key K1.

The first housing 40 is formed in a bar shape, and includes a receiving space R1 for receiving the second housing 50, an upper portion 402 formed at one side of the receiving space R1, a lower portion 404 formed at the other side, a planar surface 406 formed between the upper portion 402 and the lower portion 404, namely at the bottom of the receiving space R1, two side surfaces 408 and a front surface 409. The biaxial hinge unit 60 and a speaker unit 412 are disposed at the upper portion 402. A keypad 414 composed of a plurality of keys and a microphone unit 416 are provided to the lower portion 404 to be used in the phone and PDA operation modes.

Moreover, a lens housing 402a is protruded in a longitudinal direction of the upper portion 402. A digital camera having a lens 403 is disposed within the lens housing 402a to be exposed in a longitudinal direction of the first housing 40. An arrow of the digital camera lens 403 of FIG. 8 indicates a direction of photographing a object.

A plurality of keys are provided to the two side surfaces 408. Here, the shutter key K1 for converting a current mode into the digital camera operation mode is located at one of the side surfaces 408. That is, the shutter key K1 is adjacent to the lens housing 402a. A battery pack 430 for supplying power to the first and second housings 40 and 50 is removably mounted on the rear surface 410. In addition, an antenna unit 432 is located on the rear surface of the upper portion 402 to rotate on a sixth hinge axis A6. When the antenna unit 432 rotates, the end portion of the antenna unit 432 becomes distant from the lens housing 402a.

The biaxial hinge unit 60 provides fourth and fifth hinge axes A4 and A5 which are perpendicular to each other. The first hinge axis A4 is a rotation axis for the second housing 50 to rotate in a direction to and from the receiving space R1 of the first housing 40. The fifth hinge axis A5 is a rotation axis positioned in a vertical direction from the upper portion of the first housing 40 when the second housing 50 is opened from the first housing 40, namely a hinge axis for rotating the first housing 40 about the A5 axis.

The second housing 50 is formed in a planar plate shape, and includes an upper portion 501 and a lower portion 502. A planar surface is provided to the upper portion 501. A LCD 516 is located at the lower portion 502. In the phone operation mode or PDA operation mode, the LCD 516 of the second housing 50 is adjacent to the planar surface 406 of the first housing 40 exposing the LCD 516 to the user.

The biaxial hinge unit 60 is connected between side hinge arms 402b of the upper portion 102 to provide the fourth hinge axis A4, and is also connected to the second housing 50 at its middle portion to provide the fifth hinge axis A5 of the second housing 50.

The method of using the above-described portable communication apparatus will now be explained. To start the phone or PDA operation mode, the user uses the portable communication apparatus as shown in FIG. 12. The user inputs data or a telephone number on the LCD 516, e.g a touch screen by using a stylus (not shown), and displays the inputted data on the LCD 516. That is, the PDA LCD 516 includes the touch screen. To operate the digital camera operation mode, the user converts a current mode into the digital camera operation mode by pressing the shutter key K1.

Preferably, the second housing 50 is connected to the biaxial hinge unit 60 by a hinge module (installed in biaxial hinge unit) to rotate between 0° to 180°.

As described above, the portable communication apparatus in accordance with the present invention serves as a PDA, a digital camera and a voice or image phone, thereby reducing expenses and improving convenience. In addition, a sticker photograph or general photograph can be adhered to the upper portion 501 of the second housing 50 to show originality. A mirror also can be mounted on the upper portion 501 thereof. Furthermore, the casing of the second housing is replaceable, and thus it can be formed in various colors and shapes. When the portable communication apparatus is not used, the LCD 516 touch screen is protected as shown in the protected position of FIG. 1. While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable communication apparatus, operable in a phone operation mode or a PDA operation mode, having a digital camera, a speaker and a microphone, comprising:

a first housing including an upper portion, a lower portion, a receiving space hollowed between the upper portion and the lower portion and having a planar surface at the bottom of the receiving space, a lens housing protruding from the upper portion in a longitudinal direction wherein a lens of the digital camera is exposed in the longitudinal direction of the lens housing;

a second housing including an upper portion having a phone LCD and a phone keypad with a plurality of keys, and a lower portion having a PDA touch screen, wherein the PDA touch screen is adjacent to the planar surface in the phone operation mode, while the phone keypad and the phone LCD are adjacent to the planar surface in the PDA operation mode; and a biaxial hinge unit for connecting the second housing to the first housing to rotate the second housing about two perpendicular axes with respect to the first housing.

2. The apparatus of claim 1, wherein the upper portion of the first housing further comprises two side hinge arms, located adjacent to said speaker, for connecting the biaxial hinge unit to allow the second housing to rotate about a first of the two perpendicular axes.

3. The apparatus of claim 1, wherein the lower portion of the first housing further comprises a PDA keypad having a plurality of keys located adjacent to said microphone.

4. The apparatus of claim 1, wherein the upper portion of the first housing further comprises a shutter key adjacent to the lens housing for operating said digital camera.

5. The apparatus of claim 1, wherein the rear surface of the upper portion of the first housing further comprises a rotatable antenna unit, an end portion of the antenna unit arrayed to be distant from the lens housing in an open state.

6. A portable communication apparatus, operable in a phone operation mode or a PDA operation mode, housing a digital camera, a speaker and a microphone, comprising:

a first housing including an upper portion, a lower portion, a receiving space hollowed between the upper portion and the lower portion and having a planar surface at the bottom of the receiving space, a lens housing protruding from the upper portion in a longitudinal direction wherein a lens of the digital camera is exposed in the longitudinal direction of the lens housing; a second housing including a planar upper portion and a lower portion having a touch screen, wherein the touch screen is adjacent to the planar surface of the first housing in the phone operation mode and the PDA operation mode; and a biaxial hinge unit for connecting the second housing to the first housing to rotate the second housing about two perpendicular axes with respect to the first housing.

7. The apparatus of claim 6, wherein the upper portion of the first housing further comprises two side hinge arms, located adjacent to said speaker, for connecting the biaxial hinge unit to allow the second housing to rotate about a first of the two perpendicular axes.

8. The apparatus of claim 6, wherein the lower portion of the first housing further comprises a PDA keypad having a plurality of keys and located adjacent to the microphone.

9. The apparatus of claim 6, wherein the upper portion of the first housing further comprises a shutter key adjacent to the lens housing for operating said digital camera.

10. The apparatus of claim 6, wherein the rear surface of the upper portion of the first housing further comprises a rotatable antenna unit, an end portion of the antenna unit arrayed to be distant from the lens housing in an open state.

* * * * *